C. A. KOSER.
HORSESHOE.
APPLICATION FILED MAY 11, 1916.
1,211,454.
Patented Jan. 9, 1917.
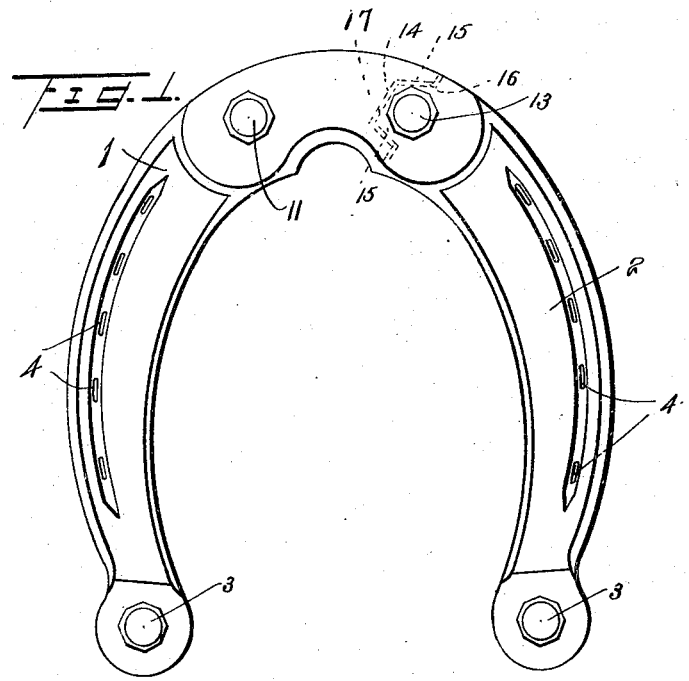
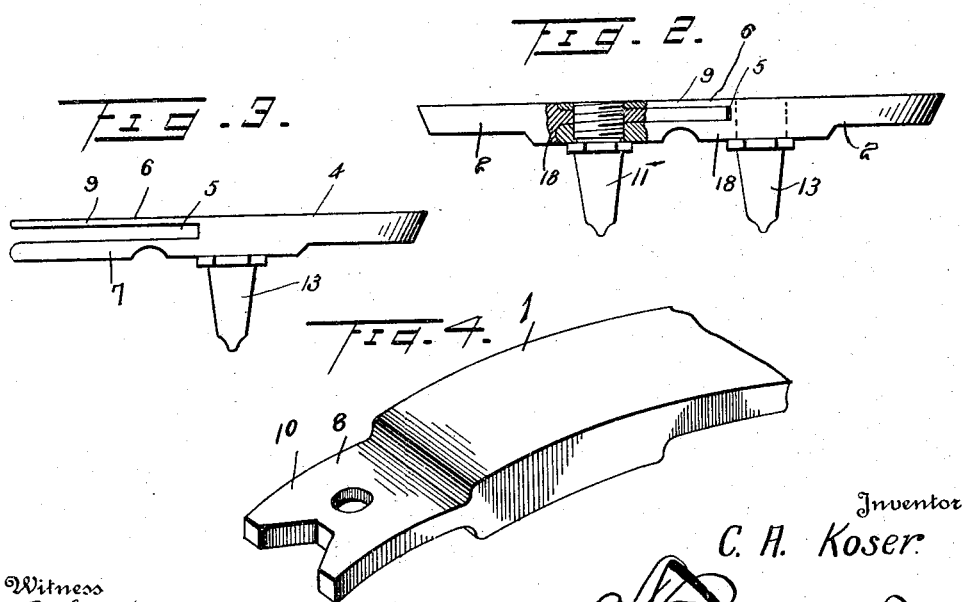
Witness
R. Stanton
Robt Meyer
Inventor
C. A. Koser.
By 
Attorney

UNITED STATES PATENT OFFICE.

CHESTER A. KOSER, OF LAKE WILSON, MINNESOTA.

HORSESHOE.

1,211,454.　　　Specification of Letters Patent.　　Patented Jan. 9, 1917.

Application filed May 11, 1916.　Serial No. 96,855.

*To all whom it may concern:*

Be it known that I, CHESTER A. KOSER, a citizen of the United States, residing at Lake Wilson, in the county of Murray and State of Minnesota, have invented certain new and useful Improvements in Horseshoes; and I do hereby declare the following to be a full, clear, and exact description of the invention, such as will enable others skilled in the art to which it appertains to make and use the same.

This invention relates to horseshoes, and the primary object of the invention is to provide a horseshoe which is composed of a pair of pivotally connected sections, so as to permit of the expansion of the shoe in accordance with the growth of the horse's hoof, thereby eliminating contraction of the hoof by the shoe, and preventing the crippling of the horse on which the shoe is attached.

A further object of this invention is to provide a horseshoe as specified, which is constructed so that the hinged sections will be permitted only a limited amount of pivotal movement so that in case one section breaks, it will not fly or move about and injure the foot of the horse, and further to provide a horseshoe structure wherein the two sections are pivotally connected by means of an ordinary calk of any construction.

With the foregoing and other objects in view this invention consists in such novel features of construction, combination and arrangement of parts as will be hereinafter more fully described, illustrated in the accompanying drawings, and claimed.

In describing the invention in detail reference will be had to the accompanying drawings wherein like characters designate like and corresponding parts throughout the several views, and in which:

Figure 1 is a bottom plan view of the improved horseshoe, Fig. 2 is an edge view of the horse shoe, Fig. 3 is an edge view of one of the sections of the horseshoe, and Fig. 4 is a perspective view of another section of the horseshoe.

Referring more particularly to the drawings, 1 and 2 designate the sections of the horseshoe, which are constructed in the usual shape, so that when they are pivotally connected they will form a horseshoe for fitting the hoof of any ordinary horse. The sections 1 and 2 have heel calks 3 attached thereto adjacent their ends, and they are provided with the usual type of nail holes 4 for facilitating their attachment to the hoof of the horse or animal. The toe portion of the section 4 is provided with a recess 5, which forms upper and lower arms 6 and 7. The recess 5 is provided for receiving the reduced arm or portion 8 of the section 1. The arms 6 and 7 are provided with alining openings 9 which are adapted for alinement with an opening 10 formed in the arm 8, so that when the arm 8 is positioned between the arms 6 and 7, all of the arms may be pivotally connected by a calk 11 of ordinary construction, the shank of which is inserted through the openings 9 and 10. The section 2 is provided with an opening 12 formed therein adjacent to the inner end of the recess 9, which opening is provided for receiving an ordinary toe calk 13. The end of the arm 8 is provided with a recess as indicated at 14, the sides of which angle as illustrated at 15, and are parallel to the angled sides 16 of a projection 17 which extends inwardly into the recess 5. When the sections 1 and 2 of the horseshoe are properly connected by means of the calk 11, the walls of the recess 14 are spaced from the edges 17 so as to permit of a limited movement of the sections with respect to each other for accommodation to the growing of the hoof of the horse to which the shoe is attached. The pivotal movement of the section with respect to each other will be limited by the engagement of either of the angled sides 16 of the projections 17 with either of the angled walls 15 of the recess 14. The toe portions of the sections 1 and 2 are reinforced as shown at 19.

Should either of the sections 1 or 2 become broken, it may be easily removed, and replaced by a new section without necessitating the removal of the entire shoe from the horse's hoof.

In reducing the invention to practice such minor features of construction, combination and arrangement of parts may necessitate alterations to which the patentee is entitled, provided such alterations are comprehended within the scope of what is claimed.

What is claimed is:

A horseshoe composed of a pair of sections the toe end of one of said sections being provided with a recess, an arm formed on the toe end of the other of said sections, and adapted for seating in said recess, alining openings formed in the toe end of said sections, and an ordinary calk extending into said openings and pivotally connecting said sections, the end of said arm being provided with a recess having inclined walls, a projection formed on and extending into said first named recess, the walls of said arm carried recess being spaced slightly from the edges of said projection for permitting of a limited pivotal movement of the sections with respect to each other.

In testimony whereof I affix my signature in presence of two witnesses.

CHESTER A. KOSER.

Witnesses:
CARL H. LIND,
A. PETERS.